United States Patent [19]
McClive

[11] 3,799,352
[45] Mar. 26, 1974

[54] DESSICANT DEVICE

[75] Inventor: Ralph T. McClive, Buffalo, N.Y.

[73] Assignee: Clecon Incorporated, Cleveland, Ohio

[22] Filed: Mar. 20, 1972

[21] Appl. No.: 236,057

[52] U.S. Cl............... 210/282, 210/287, 210/439, 210/DIG. 6
[51] Int. Cl............................................. B01d 27/02
[58] Field of Search ......................... 55/387–390; 210/264, 266, 282–284, 287–289, 323, 437–439, 502, DIG. 6

[56] References Cited
UNITED STATES PATENTS

| | | | |
|---|---|---|---|
| 2,323,160 | 6/1943 | Stecher et al.................. | 210/287 X |
| 2,583,812 | 1/1952 | Briggs et al..................... | 210/502 X |
| 3,680,707 | 8/1972 | Zeek............................... | 210/266 |
| 3,266,628 | 8/1966 | Price.............................. | 210/266 X |
| 2,395,508 | 2/1946 | Seddig ........................... | 210/264 |
| 3,201,921 | 8/1965 | Heyes ............................ | 210/264 X |

*Primary Examiner*—John Adee
*Assistant Examiner*—Robert H. Spitzer
*Attorney, Agent, or Firm*—Teare, Teare & Sammon

[57] ABSTRACT

The application discloses a desiccant device with an integral, mechanical filter adapted for use in removing solid particles and moisture from the refrigerant fluid in refrigerant systems. The device comprises a body which receives the desiccant and is pervious to the passage of refrigerant fluid through it and at least one foraminous member sealed to the body to mechanically filter the fluid passing through the body. In one form, the foraminous member extends beyond the periphery of the body in a configuration and dimension sufficient to sealingly engage the walls of the housing of the refrigerant system within which it is disposed, thereby providing a filtering seal.

13 Claims, 5 Drawing Figures

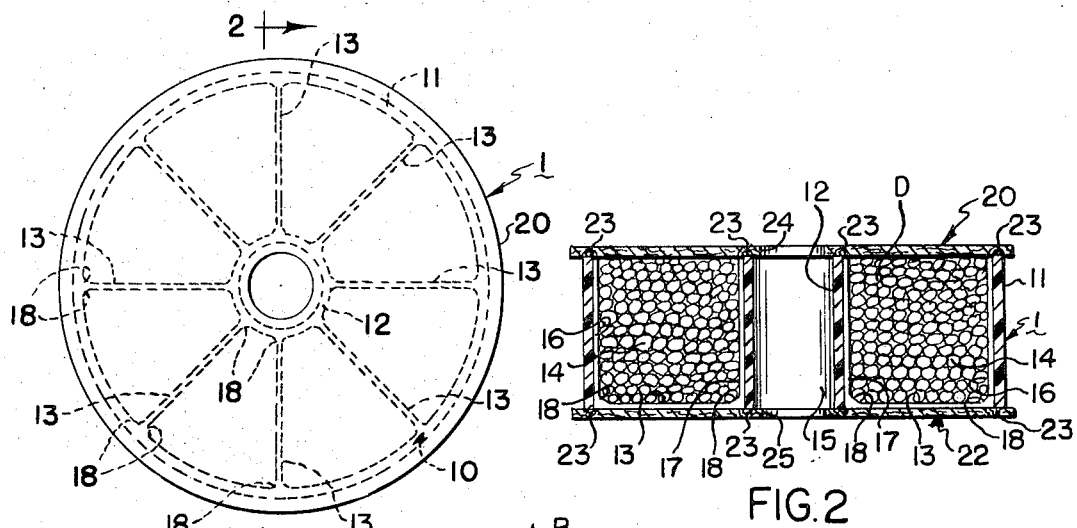
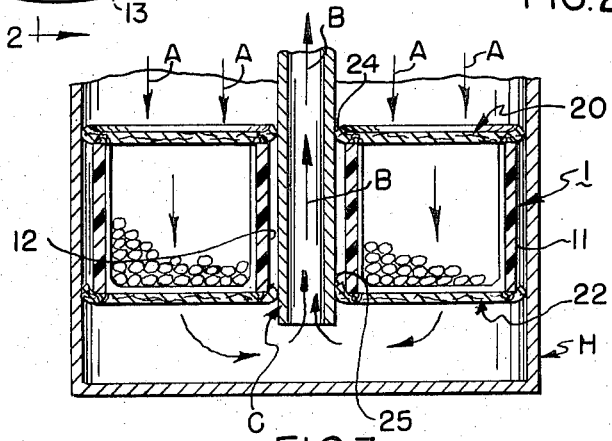
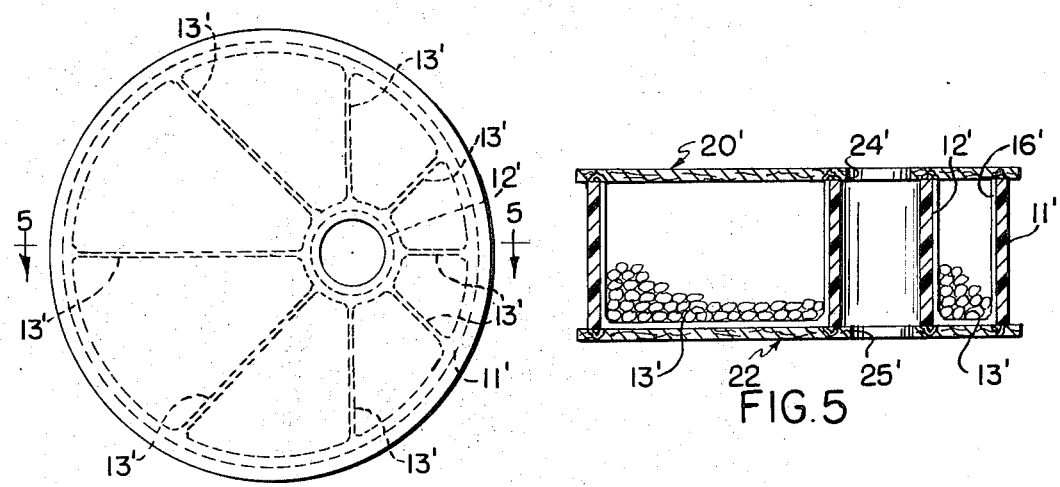

3,799,352

DESSICANT DEVICE

BACKGROUND OF THE INVENTION

The present invention relates to refrigerant systems. More particularly, the present invention relates to a device for removing moisture and solid particles from the fluid flowing through closed refrigerant systems, such as may be found in commercial, domestic or automobile air conditioning units. A device of this nature is contained within the refrigerant system in a suitable housing where the refrigerant fluid may pass over and/or through it for treatment.

Previously, desiccant had been provided in woven fabric sleeving where at least some of the fluid could bypass the desiccant by flowing through the space between the housing and the sleeving. In the past, some provision had been made for mechanical filtration of the fluid by using a second portion of the sleeving as a filter bag. These sleeving units had to be sealed to an inlet or outlet by a separate operation, such as by wiring into place. Since an extended length of sleeving was used for the filtration, separate internal support was provided to prevent collapse of the sleeving under fluid flow.

U.S. Pat. No. 3,308,957, issued Mar. 14, 1967 to L. F. Klein, exemplifies one prior art form of desiccant and strainer assembly.

SUMMARY OF THE INVENTION

The desiccant device of the present invention is adapted for use in a refrigerant system and provides a closed, solid particle impervious, refrigerant fluid pervious, receptacle. The device comprises:

a. A hollow body which includes an endless exterior wall member,
b. At least one pair of foraminous members formed of a solid particle impervious, refrigerant fluid pervious material sealingly engaged in the exterior wall member, with the wall and foraminous members defining the aforesaid receptacle, and
c. A desiccant material disposed within the receptacle.

This construction provides an integral, solid particle filtering and moisture desiccating device through which refrigerant fluid is capable of flowing. In addition, the foraminous members may extend uniformly beyond the transverse periphery of the wall member to provide a sealing member capable of sealing engagement with a housing for the device. This sealing generally prevents bypassing of the foraminous members by the refrigerant fluid.

It is an object of the present invention to provide a solid particle filter and desiccant device in a single compact and integral unit. Further, the device of the present invention minimizes bypassing of the filter or the desiccant, or preferably both, by refrigerant fluid. In addition, the device is capable of easy installation into its housing and is of a self-supporting construction so as not to collapse under fluid flow.

BRIEF DESCRIPTION OF THE DRAWINGS

FIG. 1 is a top plan view illustrating the preferred embodiment of the desiccant device 1 of the present invention;

FIG. 2 is a side elevation view, partially in section, of the embodiment of FIG. 1 taken along the line 2—2 of FIG. 1;

FIG. 3 is a fragmentary side elevational view, partially in section, of the embodiment of FIG. 1, as shown in FIG. 2, with the device 1 diagrammatically illustrated within a housing in a closed refrigerant system;

FIG. 4 is a top plan view illustrating an alternative embodiment of the desiccant device 1 of the present invention; and FIG. 5 is a side elevation view, partially in section, of the embodiment of FIG. 4 taken along the line 5-5 of FIG. 4.

DESCRIPTION OF THE PREFERRED EMBODIMENTS

The desiccant device 1 of the present invention generally, in its preferred form and as illustrated in FIG. 1, comprises a perforate body 10 and a pair of foraminous members 20 and 22 for receiving and containing desiccant material D for refrigerant fluid. The body 10, in preferred form, comprises an exterior wall member 11, an interior wall member 12 and a plurality of spacing ribs 13 interconnecting the two wall members 11 and 12. The foraminous members 20 and 22, in preferred form, comprise an upper foraminous member 20 and a lower foraminous member 22 which are sealingly joined to the body to define a fluid pervious, generally solid impervious, closed receptacle. The body 10 and upper and lower foraminous members 20 and 22 along with the desiccant material conjointly act to mechanically filter solid contaminants from the refrigerant fluid flow and to desiccate or remove moisture from that flow. The device 1 in FIG. 3 has been illustrated in the drawings with only a portion of its desiccant load in order that the internal features of the device can be more clearly seen.

In the preferred embodiment of the device 1 (and as illustrated in FIG. 1) the body 10 comprises a cylindrical exterior wall member 11 with a cylindrical interior wall member 12 concentrically located within the exterior wall member 11. This arrangement of elements provides an external conduit space 14 (FIG. 2) which is defined by the internal surface of the exterior wall member 11 and the external surface of the interior wall member 12 and by the opposing internal surfaces of the foraminous members 20 and 22. This space 14 contains the desiccant material D for flow of the refrigerant fluid through it in a first direction (as shown by the arrows A in FIG. 3). This arrangement also provides an internal conduit 15 (FIG. 2) which is defined by the internal surface of the interior wall member 12 and which is capable of conducting the filtered and desiccated refrigerant fluid in a second, or reverse, direction (as shown by the arrows B in FIG. 3) if desired. The external surface of the exterior wall member 11 may have a configuration which generally corresponds to the corresponding transverse configuration of the housing H in which the device 1 is to be disposed (see FIG. 3). In addition, a clearance may be provided between the exterior wall member 11 and the housing H to facilitate insertion of the device into the housing H. Moreover, the transverse dimensions of the external surface of the exterior wall member 11 are preferably less than the corresponding transverse interior dimensions of the housing H. In a similar manner, the internal surface of the interior wall member 12 may have a configuration which generally corresponds to the corresponding transverse configuration of the conduit C which may pass through the device 1 (FIG. 3) so that the wall 12 provides a web-like construction disposed centrally of the body 10 in the form shown. Also, a clearance is preferably provided between the interior wall member 12 and the conduit C to facilitate installation of the device 1 around the conduit C. Dimensioning the transverse dimensions of the internal surface of the interior wall member 12 preferably slightly greater than the corresponding transverse exterior dimensions of the conduit C provides this clearance. Further, by providing relatively small clearances between the exterior wall member 11 and the housing H and between the interior wall member 12 and the conduit C, substantially the entire refrigerant fluid flow passes through the desiccant material and does not bypass it.

Preferably, the wall members 11 and 12 are equal in height. The height should be sufficient to provide sufficient depth to the bed of desiccant material D so that the refrigerant fluid is effectively desiccated under the existing flow conditions. The exterior wall member 11 and the interior wall member 12 are preferably provided with internal reinforcing ribs 16 and external reinforcing ribs 17, respectively, which extend axially of their associated wall members 11 and 12 to rigidify them. In the embodiment shown, these sets of reinforcing ribs 16 and 17 (being equal in number) are equally arcuately and equally angularly spaced so that the spacing ribs 13 can extend radially outwardly from the lower edge of the interior wall member 12 to the lower edge of the exterior wall member 11 in a symmetrical pattern. The spacing ribs 13 are joined to the reinforcing ribs 16 and 17 so as to reinforce the joinder of the spacing ribs 13 to the wall members 11 and 12. By this arrangement, a relatively thin width and height spacing rib construction can be used to maximize fluid flow while still providing firm and positive location of the wall members 11 and 12 with respect to each other. To further reinforce the joinder of the ribs 13 to the wall members 11 and 12, each junction may be provided with fillets 18 (FIG. 1). Preferably, the body's components are formed of a rigid or semi-rigid material, such as a rigid or semi-rigid polymeric material. Polypropylene, polystyrene and a similar synthetic polymeric material may be used successfully.

The foraminous members 20 and 22 of the preferred embodiment of the device 1 comprise generally planar, fluid pervious and solid particle impervious sheets, such as felted sheet material, or the like. The upper and lower foraminous members 20 and 22 are sealed to the upper and lower edges, respectively, of the wall members 11 and 12 by weldments 23 (FIG. 2) to prevent refrigerant fluid from bypassing the filtering action of a foraminous member on its way to and/or from the desiccant material. The sealing weldments 23 mechanically secure the foraminous members 20 and 22 to the body 10, thereby enclosing the desiccant material D and preventing its leakage from the device 1.

In order to weld or fuse a rigid or semi-rigid material, such as is used in the body 10, to a felted, fibrous material, such as is used in each foraminous member, it has been preferable to use an ultrasonic welding technique. In this technique, vibrational mechanical energy of an ultrasonic frequency is imparted to the felt material and transmitted to the joint interface between the felt and rigid materials. There it creates frictional heat and melts the interface materials, fusing them together and providing the desired sealing weldment.

Preferably, each foraminous member 20 and 22 is centrally apertured so that the internal conduit 15 is blocked and a conduit C may be emplaced within the conduit 15. Each aperture 24 and 25 may be configured so as to generally correspond to the external configuration of the conduit C so as to be capable of providing a sealing coaction therebetween. In the form shown, each aperture is of an endless shape, such as circular. Preferably, the transverse internal dimensions of each aperture should be slightly less than the corresponding transverse external dimensions of the conduit C so that each foraminous member 20 and 22 can sealingly engage the conduit C. By this arrangement, the device may be held in a friction slide or press fit around the conduit C which then may act as a support to facilitate a preassembled installation of the component parts. In addition, each aperture edge may be uniformly spaced from the interior wall member 12. In a similar manner, the outer periphery of each foraminous member 20 and 22 may be correspondingly configured to the corresponding transverse internal configuration of the housing H so that the members 20 and 22 can sealingly mate with the housing H.

In the form shown, each foraminous member has a circular outer periphery. The transverse external dimensions of each foraminous member may be greater than the corresponding internal transverse dimensions of the housing H so that each foraminous member can sealingly engage the housing H. In addition, the outer edge of each foraminous member may be uniformly spaced from the exterior wall member 11. However, each foraminous member extends beyond both the outer periphery of the exterior wall member 11 and the inner periphery of the interior wall member 12 and, hence, overlies or extends beyond transverse peripheries of the body 10. The sealing engagement between each foraminous member and the conduit C and the housing H may act to prevent the refrigerant fluid from bypassing the filtering action of the foraminous members 20 and 22.

In order to provide the desired filtering action by the foraminous members 20 and 22, it is preferred that they be composed of sheets of a non-woven, or felted, fibrous material of sufficient thickness to mechanically filter out and trap undesired solid particles, such as solder particles, desiccant fragments, contaminating dirt particles, or the like. Preferably, the foraminous members are made from a polymeric material which can be compatibly fused or welded to the body 10, as aforesaid. Preferably, the non-woven fibrous material may be a polymeric felt, such as a polypropylene, or polyester felt.

In one form, the device 1 may be installed in the housing H (FIG. 3) by pre-assembling the device around the conduit. In such case, the free end of the conduit C is simply inserted through the uppermost aperture 34 and then through the next or lowermost aperture 25 until it extends to the desired distance below the lower foraminous member 22. During this insertion, the marginal edges of the respective apertures 24 and 25 flex to accomodate the transverse dimension of the conduit, whereupon the device will be held in frictional support engagement on the conduit. Thus assembled, the device 1 carried by the conduit C is inserted, as a unit, down into the housing H wherein the edges of the respective foraminous members 20 and 22 sealing engage in a wiping action the confronting interior surfaces of the housing. Upon seating of an end cap (not shown) attached to the upper end of the conduit upon the upper end of the housing, the installation is complete and ready for operation.

During operation of the refrigerant system (FIG. 3), substantially the entire refrigerant fluid flow would pass through the upper foraminous member 20 where it would be initially mechanically filtered, then through the desiccant material where it would be desiccated and finally through the lower foraminous member 22 where it would be filtered a second time before being exhausted through the conduit C.

In an alternative embodiment of the device 1, illustrated in FIGS. 4 and 5, the interior wall member 12' is disposed eccentrically of the exterior wall member 11', or to one side of the geometric center of the exterior wall member 11'. This modification is desirable when the conduit C is disposed off-center or eccentrically within the housing. In order to compensate for the displacement of the interior wall member 12', the apertures 24' and 25' of the upper and lower foraminous members 20' and 22' are similarly disposed eccentrically, or off-center, with a uniform margin between the edge of each aperture and the interior wall member 12'. The orientation of the spacing ribs 13' with respect to the exterior wall member 11' and the spacing of the reinforcing ribs 16' on the internal surface of the exterior wall member 11' are also modified. The spacing ribs 13' remain in equally arcuately and equally angularly spaced orientation as they radiate outwardly from the interior wall member 12'. However, since the interior wall member 12' is eccentrically positioned, the spacing ribs 13' will intersect the exterior wall member 11' at unequal arcuate intervals. A reinforcing rib 16' is disposed at each point of intersection, so that the reinforcing ribs 16' are also disposed at unequal arcuate intervals.

While the foraminous members 20 and 22 have been disclosed as preferably non-woven, or felted material, a woven, or mesh, material might be used. The external surface of the exterior wall member 11 and the internal surface of the interior wall member 12 have been disclosed as circular in top plan (or as infinite-sided polygons) to correspond to a circular housing H and a circular conduit C respectively. In those instances where either the housing H, or the conduit C, or both, are polygonal in top plan (or are finite-sided polygons), the external surface of exterior wall member 11, or the internal surface interior wall member 12, or both, respectively, should have a corresponding polygonal shape in top plan. In addition, the external periphery of each foraminous member 20 and 22, and the apertures 24 and 25, should be similarly configured. In those instances where a bypassing of the refrigerant around the foraminous members and the desiccant is permissible, the sealing engagement between the device and the housing H, or the conduit C, or both, may be eliminated, as desired. In those refrigerant systems where the refrigerant fluid would flow in a single direction through the housing H and the conduit C was replaced by an outlet in the housing H below the device 1, the interior wall member 12, along with its reinforcing ribs 17, and the apertures 24 and 25 would not be present so that the foraminous members 20 and 22 would not be apertured and the space previously occupied by the interior wall member 12 would be available for holding desiccant material. In those instances where multiple conduits C are used, the body 10 would be provided with a corresponding member of interior wall members 12 suitably disposed and each foraminous member would be provided with a corresponding number of apertures suitably disposed.

By the foregoing construction and interrelation of its component elements, the present invention's desiccant device provides an integral solid particle filter and moisture desiccant. The device is capable of minimizing refrigerant fluid bypass of the particle filter and moisture desiccant. In view of its solid construction, the unit is self-supporting under fluid flow and readily installed. Since, in preferred form, the unit is symmetrical with respect to a transverse, or horizontal plane passing through the midpoint of its height, it can be installed with either foraminous member up, further facilitating installation thereof.

I claim:

1. A unitary, one-piece desiccant device containing a desiccant material adapted for replaceable installation in a refrigeration system of the type having a hollow housing for interiorly mounting said device for removing moisture from a refrigerant fluid said desiccant device comprising, a hollow body member containing said desiccant material removably insertable in a bore in said housing in the path of refrigerant flow therethrough, said body member including an axially rigid, endless exterior side wall made from a polymeric material and having upper and lower peripheral end edges, said side wall being of a fluid impervious, self-supporting construction having a maximum transverse dimension which is less than the corresponding minimum transverse dimension of the bore in said housing, said body including upper and lower flexible, filter members each made from a fluid pervious, polymeric fibrous material, the polymeric material of said body and filter members being sufficiently compatible with one another so that said upper and lower filter members are secured in heat fused and sealed engagement with the confronting surfaces of the associated upper and lower end edges of said body member respectively, said body and filter members together defining a closed receptacle for containing said desiccant material and with said filter members conjointly acting with particles and moisture from said refrigerant flow, said filter members being of a generally flat construction extending generally parallel to one another and generally normal to the longitudinal central axis of said body member, at least one of said filter members extending transversely outwardly beyond the outer periphery of said side wall to provide an endless flexible flap portion adapted to sealingly engage the confronting interior surface of said housing, said flap portion being of said fluid pervious construction to enable refrigerant flow therethrough and adapted for mechanically filtering solid particles from said refrigerant flow thereby to retard general bypassing of refrigerant through the desiccant material of said desiccant device, and said body and filter members being made from polymeric materials selected from compatible heat fusible materials selected from the group consisting of polypropylene, polystyrene and the like.

2. A desiccant device in accordance with claim 1, wherein said upper and lower filter members each extend transversely outwardly beyond the outer periphery of said side wall to provide a pair of said endless, flexible flap portions.

3. A desiccant device in accordance with claim 1, wherein said filter members are made from a polymeric felt material of the type that is fusible by ultrasonic welding to the upper and lower edges of said side wall.

4. A dessicant device in accordance with claim 1, including an interior endless side wall disposed radially inwardly of said exterior side wall and defining an axial passageway extending between said filter members, and web means rigidly mounting said interior side wall in predetermined spaced relation with respect to said exterior side wall.

5. A dessicant device in accordance with claim 4, wherein, said filter members each includes an aperture communicating with said passageway and aligned therewith to receive a conduit element inserted therethrough.

6. A dessicant device in accordance with claim 5, including flange-like means disposed adjacent at least one end of said interior side wall, and said flange-like means projecting radially inwardly in a direction toward the longitudinal central axis of said passageway adapted for coacting friction sealing engagement with the confronting surfaces of said conduit element.

7. A dessicant device in accordance with claim 6, wherein said flange-like means are formed generally from the material of said filter member and project radially inwardly a distance sufficient to frictionally hold said device in supported relation on said conduit element.

8. A dessicant device in accordance with claim 5, wherein the longitudinal central axis of said interior side wall is co-incident with the longitudinal central axis of said exterior side wall.

9. A dessicant device in accordance with claim 4, wherein the longitudinal central axis of said interior wall member extends between the longitudinal central axis of said exterior wall member and the internal surface of said exterior wall.

10. A dessicant device in accordance with claim 4, wherein said web means includes a plurality of rib elements extending outwardly from said interior wall to said exterior wall.

11. A dessicant device in accordance with claim 4, wherein said web means includes a plurality of spaced rib elements, certain of said rib elements extending axially of said interior wall, others of said rib elements extending radially from said interior wall to said exterior wall, and additional rib elements extending axially of said exterior wall.

12. A dessicant device in accordance with claim 4, wherein said web means includes a plurality of spaced radially extending rib elements, said rib elements being made integral at one end with said interior wall and being made integral at their opposite ends with said exterior wall so as to hold both of said walls in generally rigid predetermined spaced relationship with respect to one another.

13. A unitary, one-piece desiccant device containing a desiccant material adapted for replaceable installation in a refrigeration system of the type having a cylindrical, hollow housing for interiorly mounting said device for removing moisture from a refrigerant fluid, said desiccant device comprising, a cylindrical, hollow body member containing said desiccant material removably insertable in a bore in said housing in the path of refrigerant flow therethrough, said body member including a substantially axially rigid, endless exterior side wall made from a polymeric material and having upper and lower peripheral end edges, said side wall being of a fluid impervious, self-supporting construction having a maximum transverse dimension which is less than the corresponding minimum transverse dimension of the bore in said housing, said body including upper and lower flexible, filter members each made from a fluid pervious, polymeric material, said body and filter members being of the same polymeric material so that said upper and lower filter members are secured in heat fused and sealed engagement with the confronting surfaces of the associated upper and lower end edges of said body member respectively, said body and filter members together defining a closed receptacle for containing said desiccant material and with said filter members conjointly acting with said desiccant material to mechanically filter solid particles and moisture from said refrigerant flow, said filter members being of a generally flat construction extending generally parallel to one another and generally normal to the longitudinal central axis of said body member, at least one of said filter members extending tranversely outwardly beyond the outer periphery of said side wall to provide an endless flexible flap portion adapted to engage the confronting interior surface of said housing, for mechanically filtering solid particles from said refrigerant flow thereby to retard general bypassing of refrigerant through the desiccant material of said desiccant device.

* * * * *